(12) United States Patent
Karaoguz et al.

(10) Patent No.: US 10,885,778 B2
(45) Date of Patent: Jan. 5, 2021

(54) TRAFFIC MONITORING SYSTEM WITH DISPLAY OF A VIRTUAL IMAGE OF MOVING OBJECTS IN A PORTION OF ROADWAY INFRASTRUCTURE

(71) Applicant: TRANSDEV GROUP, Issy les Moulineaux (FR)

(72) Inventors: Cem Karaoguz, Palaiseau (FR); Jean-Christophe Smal, Puteaux (FR); Kien-Cuong Nguyen, Antony (FR); Alexis Beauvillain, Massy (FR)

(73) Assignee: Transdev Group, Issy les Moulineaux (FR)

( * ) Notice: Subject to any disclaimer, the term of this patent is extended or adjusted under 35 U.S.C. 154(b) by 0 days.

(21) Appl. No.: 16/396,507

(22) Filed: Apr. 26, 2019

(65) Prior Publication Data

US 2019/0333372 A1    Oct. 31, 2019

(30) Foreign Application Priority Data

Apr. 26, 2018  (FR) ...................................... 18 53670

(51) Int. Cl.
*G08G 1/052* (2006.01)
*G01S 13/92* (2006.01)
(Continued)

(52) U.S. Cl.
CPC .............. *G08G 1/052* (2013.01); *G01S 13/92* (2013.01); *G01S 17/88* (2013.01); *G08G 1/0116* (2013.01); *G08G 1/04* (2013.01)

(58) Field of Classification Search
None
See application file for complete search history.

(56) References Cited

U.S. PATENT DOCUMENTS

| 2009/0046897 A1* | 2/2009 | Rowsell ................... G08G 1/04 382/107 |
| 2009/0237510 A1 | 9/2009 | Chen et al. |

(Continued)

FOREIGN PATENT DOCUMENTS

| EP | 1262933 A1 | 12/2002 |
| EP | 3035314 A1 | 6/2016 |

OTHER PUBLICATIONS

Search Report for French Application No. 1853670, dated Jan. 16, 2019 in 2 pages.

*Primary Examiner* — Rebecca A Volentine
(74) *Attorney, Agent, or Firm* — Knobbe, Martens, Olson & Bear, LLP

(57) ABSTRACT

A monitoring system includes a sensor system for capturing at a capture instant, information relating to moving objects moving in a roadway infrastructure portion, and a control station comprising a display for displaying at a display instant subsequent to the capture instant, a view of the roadway infrastructure portion on which is visible an image of each moving object. The monitoring system also includes at least one computer for deriving captured information of a measured position and speed of each moving object at the capture instant, and another computer for deducing the measured position and speed at an estimated position of each moving object at the display instant. The display is configured to display in the view of the road infrastructure portion a virtual image of each moving object at its estimated position.

9 Claims, 2 Drawing Sheets

(51) Int. Cl.
*G01S 17/88* (2006.01)
*G08G 1/01* (2006.01)
*G08G 1/04* (2006.01)

(56) References Cited

U.S. PATENT DOCUMENTS

| | | |
|---|---|---|
| 2011/0298928 A1 | 12/2011 | Chen et al. |
| 2014/0267734 A1* | 9/2014 | Hart, Jr. .................. G08G 1/07 |
| | | 348/149 |
| 2016/0065944 A1 | 3/2016 | Fujii et al. |
| 2016/0364614 A1* | 12/2016 | Edmondson ....... G06K 9/00771 |
| 2017/0237882 A1* | 8/2017 | Shiohara .................. B60R 1/00 |
| | | 348/148 |
| 2017/0316693 A1 | 11/2017 | Kim |
| 2018/0061105 A1* | 3/2018 | Ito ............................. G06T 7/70 |
| 2018/0096595 A1* | 4/2018 | Janzen ................ G06K 9/0063 |
| 2018/0204335 A1* | 7/2018 | Agata .................... G06T 7/292 |
| 2018/0330481 A1* | 11/2018 | Watanabe ................ G08G 1/16 |
| 2018/0357772 A1* | 12/2018 | Takemura .......... G06K 9/00805 |
| 2019/0361436 A1* | 11/2019 | Ueda .................... B60W 30/08 |

* cited by examiner

TRAFFIC MONITORING SYSTEM WITH DISPLAY OF A VIRTUAL IMAGE OF MOVING OBJECTS IN A PORTION OF ROADWAY INFRASTRUCTURE

CROSS-REFERENCE TO RELATED APPLICATIONS

This application is a U.S. non-provisional application claiming the benefit of French Application No. 18 53670, filed on Apr. 26, 2018, which is incorporated herein by reference in its entirety.

FIELD OF THE INVENTION

The present invention relates to a system for monitoring traffic in a portion of roadway infrastructure, of the type comprising a sensor system for capturing at a capture instant at least one piece of information relating to at least one moving object moving in the said portion of roadway infrastructure, and a control station comprising a display for displaying at a display instant subsequent to the capture instant, on the basis of the, or each, piece of information captured by the sensor system, a view of the portion of roadway infrastructure on which is visible an image of the, or each, moving object moving in the portion of roadway infrastructure.

The invention also relates to a method for monitoring traffic in a portion of roadway infrastructure, of the type comprising the following steps:
capturing, at a capture instant, at least one piece of information relating to at least one moving object moving in the portion of roadway infrastructure, and
displaying, at a control station, at a display instant subsequent to the capture instant, on the basis of the, or each, piece of captured information, a view of the portion of the roadway infrastructure on which is visible the, or each, moving object moving in the portion of roadway infrastructure.

BACKGROUND

Traffic monitoring systems of the above type are known. They allow operators at the control station to monitor portions of a roadway infrastructure, such as junctions or intersections. The operators may thus take appropriate traffic control measures in case of problems occurring in one of the monitored portions.

For this purpose, known monitoring systems generally comprise cameras capturing images of the portion of the roadway infrastructure and supplying these images to the control station in the form of a video stream which, once displayed, constitutes the view of the portion of roadway infrastructure.

The known systems, however, do not give complete satisfaction. Control stations are often far from the monitored portions of infrastructure, and the latency is usually long between the capture instant when a camera captures an image of a portion of the roadway infrastructure and the display instant when this image is displayed at the control station as a view of the infrastructure portion. This delay in the information reaching the control station may prevent the operators in place from making the appropriate decisions.

SUMMARY

An object of the invention is thus to provide an operator operating at the control station of a traffic monitoring system with updated information reflecting as accurately as possible the state of the traffic in a portion of roadway infrastructure so that it presents itself at the moment when the information reaches the operator. Another object is to provide this information in intelligible form quickly and requiring little cognitive resources to be interpreted.

For this purpose, the object of the invention is a monitoring system of the aforementioned type, comprising at least a first computer for deriving from the, or each, piece of information captured by the sensor system, a measured position and a measured speed of the, or each, moving object at the capture instant, and a second computer for deriving from the measured position and speed, an estimated position of the, or each, moving object at the instant of display, wherein the display is configured to display in the view of the portion of roadway infrastructure, a virtual image of the, or each, moving object at its estimated position.

According to particular embodiments of the invention, the monitoring system also has one or more of the following features, taken in isolation or in any technically feasible combination(s):
the sensor system comprises at least one camera configured to capture at the capture instant, an image of the roadway infrastructure portion and the, or each, moving object moving in it, wherein the image constitutes information relating to the, or each, of the moving object(s);
the sensor system comprises at least one radar and/or at least one LIDAR configured to capture at the capture instant a radar echo, respectively a LIDAR echo, of the, or each, moving object moving in the portion of roadway infrastructure, the radar echo, respectively the LIDAR echo, constituting information relating to the one or each moving object(s);
the image captured by the camera at the capture instant constitutes the view of the portion of roadway infrastructure;
the camera is configured to capture images of the roadway infrastructure portion at a predetermined frequency, wherein the display is configured to refresh the view of the roadway infrastructure portion at a frequency greater than or equal to the predetermined frequency;
the first computer is configured to deduce the measured position and the measured speed of the, or each, moving object by comparison of the image captured by the camera at the capture instant with an image of the portion of roadway infrastructure captured previously by the camera;
the camera is fixed relative to the portion of roadway infrastructure;
the virtual image is overprinted on the view of the portion of roadway infrastructure;
the first computer is included in the sensor system; and the second computer is included at the control station.

The subject of the invention is also a monitoring method of the aforementioned type, comprising the following steps:
calculating, from the, or each, piece of information captured, a measured position and a measured speed of the, or each, moving object at the capture instant,
deducing, from the measured position and speed, an estimated position of the, or each, moving object at the display instant, and
display, in the view of the roadway infrastructure portion, a virtual image of the, or each, moving object at its estimated position.

According to particular embodiments of the invention, the monitoring method also has one or more of the following features, taken alone or in any technically feasible combination:

- the capture of information comprises capturing an image of the roadway infrastructure portion;
- the capture of information comprises, synchronously with the image capture, the capture of a radar and/or LIDAR echo of the, or each, moving object moving in the portion of the roadway infrastructure;
- the captured image constitutes the view of the roadway infrastructure portion;
- the calculation of the measured position and speed comprises the following substeps:
    - comparison of the captured image at the capture instant with an image of the portion of roadway infrastructure captured previously, and
    - deducing, from this comparison, the measured position and the measured speed of the, or each, moving object
- the measured position and speed are deduced from the last radar and/or LIDAR echoes of the, or each, moving object;
- the virtual image is overprinted on the view of the portion of roadway infrastructure; and
- the steps of capture, calculation, deduction and display are repeated at a predetermined frequency.

BRIEF DESCRIPTION OF THE DRAWINGS

Other features and advantages of the invention will appear upon reading the description which follows, given solely by way of example and with reference to the appended drawings, wherein.

DETAILED DESCRIPTION

Figure 1:
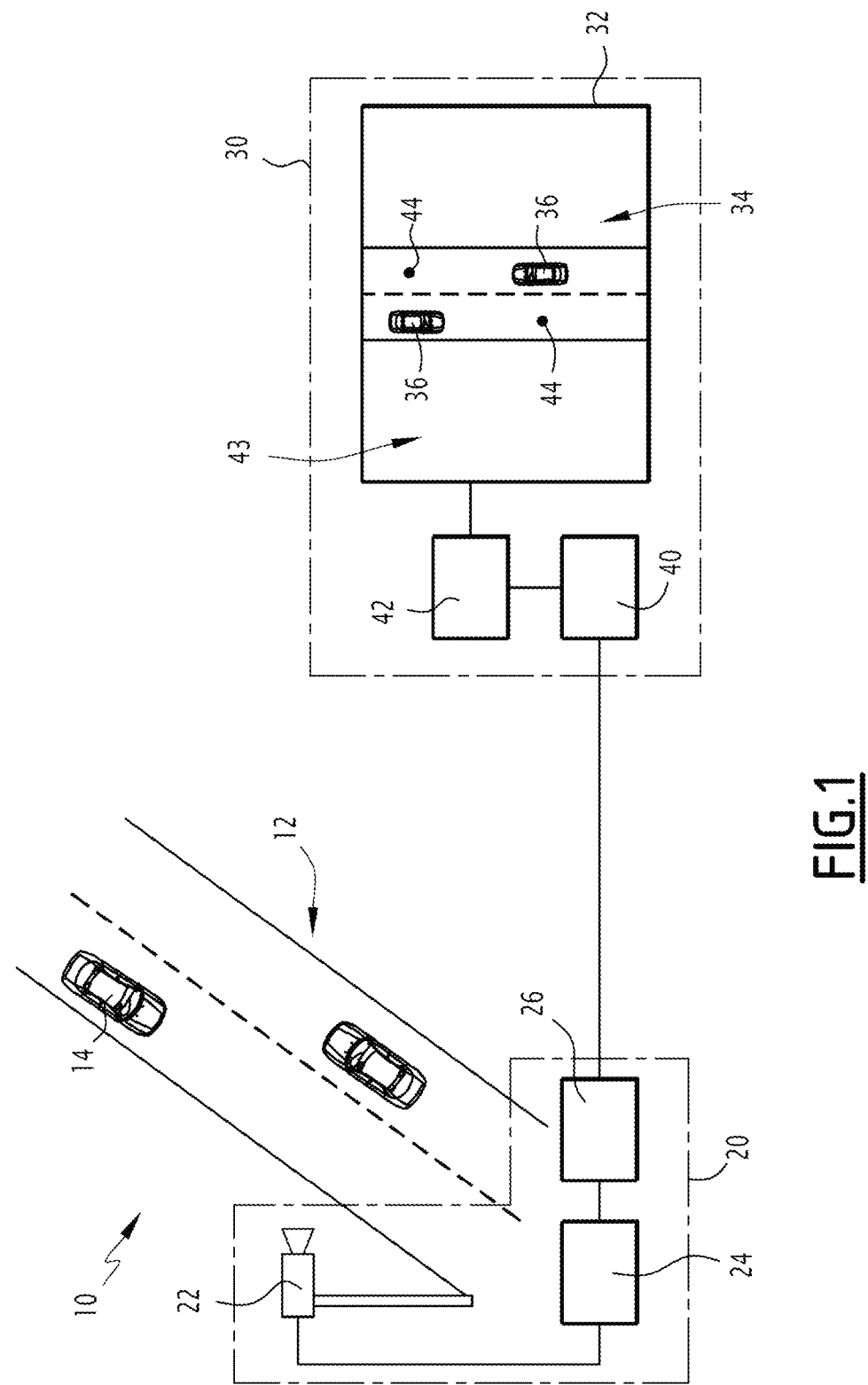
FIG. 1 shows a schematic view of a monitoring system according to the invention.

The monitoring system 10 shown in FIG. 1 is intended to monitor traffic in a portion of roadway infrastructure 12, here constituted by a single roadway. In a variant, the portion of roadway infrastructure 12 is constituted by a junction or an intersection.

The traffic in the roadway infrastructure portion 12 is constituted by the displacement of at least one moving object 14 moving in the roadway infrastructure portion 12. In the example shown, this traffic is made up of the displacement of several moving objects 14, here two, inside the roadway infrastructure portion 12, wherein each moving object 14 is a motor vehicle. Alternatively, at least one of the moving objects 14 may be another type of road user, for example a pedestrian or a cyclist.

To monitor this traffic, the monitoring system 10 comprises a sensor system 20 for capturing at least one piece of information relating to each moving object 14 at the capture instants.

This sensor system 20 is arranged near the roadway infrastructure portion 12.

A first piece of information relating to each moving object 14 that the sensor system 20 is able to capture is constituted by an image of the moving object 14. For this purpose, the sensor system 20 comprises a camera 22.

The camera 22 is fixed relative to the infrastructure portion 12.

The camera 22 is configured to capture images in the visible spectrum. It has a field of vision encompassing the infrastructure portion 12 and is therefore configured to capture images in the visible spectrum of the infrastructure portion 12, wherein each image comprises an image of the, or each, moving object 14 then moving in the infrastructure portion 12.

The camera 22 is, in particular, configured to capture these images at a predetermined frequency, typically between 10 and 60 Hz.

Optionally, the sensor system 20 may be capable of capturing other information relating to each moving object 14, such as at least one other image, an infrared image, a radar echo or a LIDAR echo of the moving object 14, wherein this information is captured synchronously with the images captured by the camera 22. For this purpose, the sensor system 20 also comprises at least one other video camera, an infrared camera, a radar and/or a LIDAR (not shown) configured to capture the above information at the capture instant.

The sensor system 20 further comprises a first computer 24 for deriving from the, or each, piece of information captured by the sensor system 20 a measured position and a measured speed of each moving object 14 at the capture instant.

The first computer 24 is configured to update this position and speed measured at a frequency substantially equal to the predetermined frequency.

Here, the first computer 24 is configured to derive this measured position and speed by comparing the image captured by the camera 22 at the most recent capture instant with the previous image of the roadway infrastructure portion 12 captured by the camera 22. For this purpose, the first computer 24 is configured, in a known manner, to implement a sequence of image processing steps typically comprising:

- pretreatment of the images, with, for example, filtering of each image,
- object detection, typically by background subtraction or by machine learning, and
- object tracking.

Alternatively (not shown), the first computer 24 is configured to derive the measured position and speed by analyzing the latest radar echoes and/or LIDAR of the, or each, moving object 14 captured by the sensor system 20.

The first computer 24 is typically in the form of software stored in a memory (not shown) and able to be executed by a processor (not shown) associated with the memory, wherein the memory and the processor together form a processing unit included in the sensor system 20. As a variant, the first computer 24 may be made in the form of a programmable logic component or in the form of a dedicated integrated circuit included in the sensor system 20.

The sensor system 20 finally comprises a communication system 26 able to provide from the sensor system 20 the images captured by the camera 22, as well as the measured position and speed of each moving object 14. For this purpose, the communication system 26 is configured to implement a predetermined communication protocol, for example a TCP, IP or UDP communication protocol. Optionally, the communication system 26 may be configured to transmit data by air.

The monitoring system 10 also comprises a control station 30 that is remote from the infrastructure portion 12 for controlling the infrastructure portion 12 by an operator. This control station 12 comprises a display 32 for displaying a view 34 of the roadway infrastructure portion 12 on which is visible an image 36 of each moving object 14.

The control station 30 is so configured that the view 34 is based on the, or each, piece of information captured by the sensor system 20. In particular, the control station 30 is here configured so that the view 34 is constituted by an image of the infrastructure portion 12 captured by the camera 22; thus, the image 36 is a real image of each moving object 14, constituted by the image of the moving object 14 captured by the camera 22 at a capture instant.

For this purpose, the control station 30 is configured to receive the images captured by the camera 22, as well as the measured positions and speeds of each moving object 14. It therefore comprises a communication device 40 compatible with the communication system 26, i.e. implementing the predetermined communication protocol used by the communication system 26.

The control station 30 is, in particular, configured so that the view 34 is constituted by the last image of the infrastructure portion 12 received by the communication device 40.

Due to the data transfer time between the communication system 26 and the communication device 40, and the data processing time of the system sensor system 20 and the control station 30, the display 32 is configured to display the view 34 at a display instant subsequent to the capture instant of the view 34 by the camera 22, with a delay relative to the capture instant.

This delay is liable to cause errors of judgment on the part of the operator controlling the infrastructure portion 12. In order to avoid such errors of judgment, the control station 30 is configured to provide the operator with enriched information compared to the simple view 34.

For this purpose, the control station 30 comprises a second computer 42 configured to calculate the delay between the display and capture instants and to deduce from this delay, as well as the last measured position and speed received by the communication device 40, an estimated position of each moving object 14 at the display instant. To do this, the second computer 42 is configured to implement the following algorithm:

$$p_{est} = p_{mes} + \Delta t \times v$$

where $p_{est}$ is the estimated position, $p_{mes}$ is the last measured position received by the communication device 40, $\Delta t$ is the calculated delay, and v is the measured speed.

The second computer 42 is typically implemented in the form of software stored in a memory (not shown) and able to be executed by a processor (not shown) associated with the memory, wherein the memory and the processor together form a processing unit included in the control station 30. Alternatively, the second computer 42 may be implemented as a programmable logic component or as a dedicated integrated circuit included in the control station 30.

The second computer 42 is also configured to receive the view 34 of the roadway infrastructure portion 12 to create an enriched view 43 integrating in the view 34 a virtual image 44 of each moving object 14 at its estimated position, and transmitting this enriched view 43 to the display 32. The second computer 42 is so configured that the virtual image 44 appears unrealistically in the view 43, in order to allow the operator to easily distinguish the virtual image 44 from the real image 36.

The display 32 is thus configured to display in the view 34 of the roadway infrastructure portion 12 overprinted on the view 34, the virtual image 44 of each moving object 14 at its estimated position.

The second computer 42 is further configured to update the calculation of the estimated position at a display frequency greater than or equal to the predetermined frequency, and to update the enriched view 43 at a frequency substantially equal to the display frequency. The display 32 is itself configured to refresh its display at the display frequency, in order to display the view 43, at each refresh, at a new display instant, wherein the second computer 42 is configured to use this new display instant in the calculation of the delay from which the estimated position is deduced.

Figure 2:
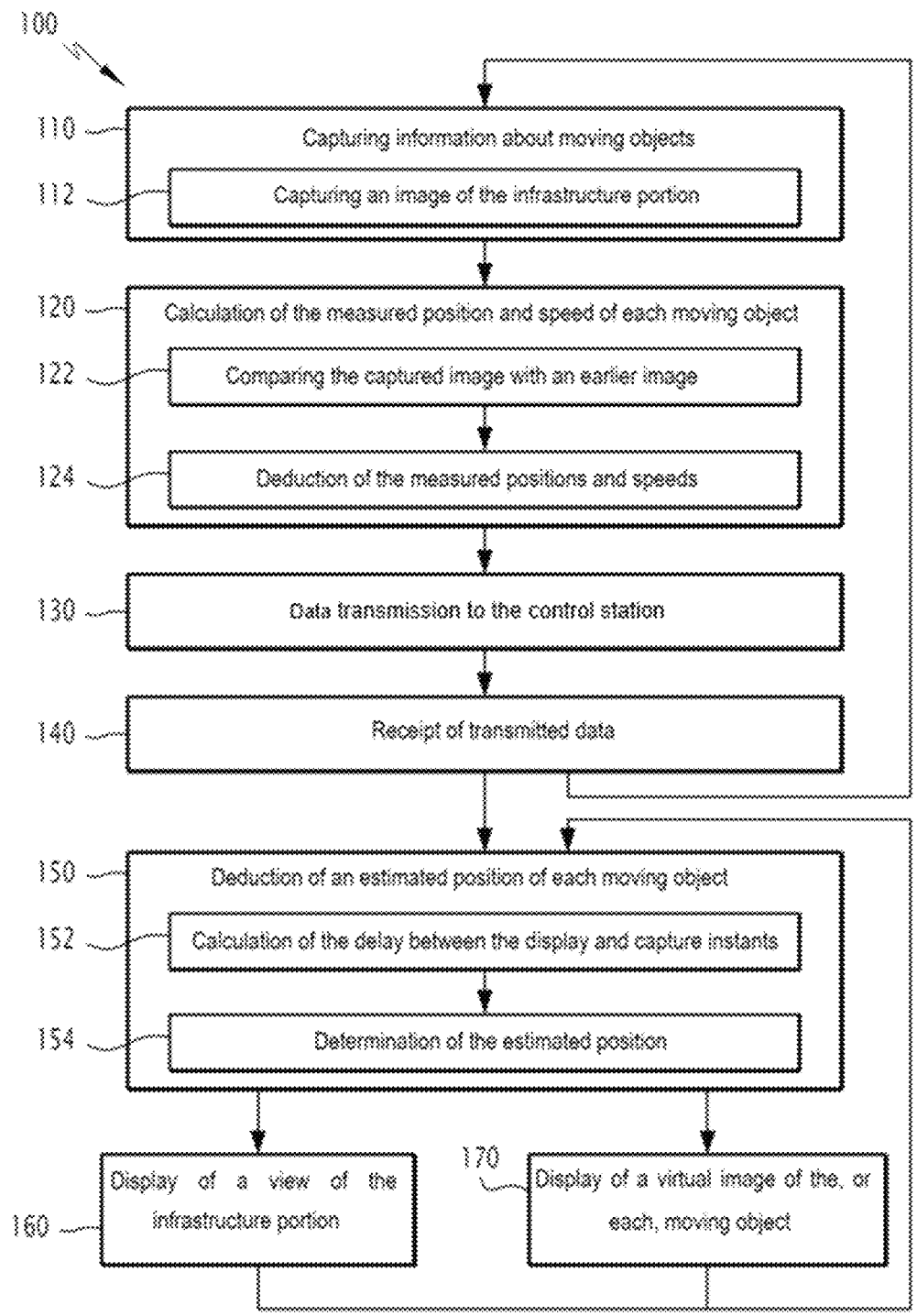
FIG. 2 shows a block diagram illustrating a monitoring method implemented by the monitoring system of FIG. 1.

A method 100 for monitoring the roadway infrastructure portion 12, implemented by the monitoring system 10, will now be described, with reference to FIG. 2.

This method 100 comprises a first step 110 of capturing, at a capture instant, at least one piece of information relating to each moving object 14 moving in the infrastructure portion 12. This step 110 comprises the capture 112, at a capture instant, of an image of the infrastructure portion 12 by the camera 22. Optionally, the step 110 may also comprise a substep (not shown), synchronous with the substep 112, the capture of at least one other piece of information such as at least one other image, an infrared image, a radar echo, or a LIDAR echo of the moving object 14.

The step 110 is followed by a step 120 of calculating, by the first computer 24, the measured position and the measured speed of each moving object 14 at the capture instant.

The step 120 here comprises the comparison 122 of the captured image at the capture instant with an image of the roadway infrastructure portion 12 captured previously, then the deduction 124, from this comparison 122, of the measured position and the measured speed of each moving object 14. Step 120 further includes storing 126 the captured image at the capture instant for use as an image previously captured at the next repetition of step 120.

The deduction step 124 typically comprises the following substeps (not shown):
pretreatment of the images, for example by filtering each image,
object detection, typically by background subtraction or machine learning, and
object tracking.

In the case (not shown) where the sensor system 20 comprises a radar, the step 120 comprises measuring the position and the speed of each moving object 14 by means of the radar echo of the moving object 14.

In the case (not shown) where the sensor system 20 comprises a LIDAR, the step 120 comprises the comparison of a captured LIDAR echo at the capture instant with a previously captured LIDAR echo, and then the deduction, from this comparison, of the measured position and the measured speed of each moving object 14, before the storage of the captured LIDAR echo at the capture instant for its use as an echo previously captured at the next repetition of step 120.

The step 120 is itself followed by a step 130 of transmission, by the communication system 26, of the image of the infrastructure portion 12, the measured position and the speed measured at the control station 30.

These steps 110, 120, 130 occur during the capture instant and are repeated at the predetermined frequency.

The method 100 further comprises a step 140 of receiving the transmitted data by the communication device 40. This step 140 follows the transmission step 130, after a transmission delay, and occurs at a display instant.

The step 140 is followed by a step 150 of deduction, by the second computer 42, of an estimated position of each moving object 14 at the display instant. This step 150 comprises the calculation 152, by the second computer 42, of the delay between the display instant and the capture instant, then the determination 154 of the estimated position from the calculated delay and the last measured positions and speeds received by the communication device 40, by application of the algorithm presented above.

The step 150 is itself followed by a display step 160, by the display 32 of the view 34, wherein this view 34 is here constituted by the last image of the infrastructure portion 12 received by the communication device 40.

The method 100 further comprises a step 170 of displaying, in the view 34 and overprinted on the view 34, the virtual image 44 of each moving object 14 at its estimated position. This step 170 is substantially simultaneous with the display step 160.

These steps 140, 150, 160, 170 occur during the display instant. Step 140 is repeated with steps 110, 120, 130 at the predetermined frequency. Steps 150, 160, 170 are themselves repeated at the display frequency.

It should be noted that steps 110, 120, 130, 140, 150, 160, 170 of method 100 are not instantaneous. Therefore, the term "instant" used above and in the claims is not understood to mean a point in time, but simply a moment that is significantly shorter than the time of data transmission between the sensor system 20 and the control station 30.

In a variant (not shown) of the invention, the first computer 24 is included in the control station 30 instead of being included in the sensor system 20. In this variant, the data transmitted from the sensor system 20 to the control station 30 are exclusively constituted by the, or each, piece of information, including the image of the infrastructure portion 12, captured by the sensor system 20. In addition, the step 120 then occurs after the steps 130 and 140, during the display instant and not during the capture instant; step 120, however, continues to be repeated at the predetermined frequency.

Thanks to the invention described above, the operator of the control station 30 thus has an enriched view of the infrastructure portion 12 allowing him to better understand the state of the traffic in the infrastructure portion 12 when they watch it. The operator may therefore make traffic management decisions better configured to this state.

In addition, this view is presented to the operator in a form that allows them to easily grasp the information provided to them, wherein the operator may, in particular, easily distinguish the actual data from the estimated and, therefore uncertain, data.

The invention claimed is:

1. A system for monitoring traffic in a roadway infrastructure portion, comprising a sensor system for capturing at a capture instant at least one piece of information relating to at least one moving object moving on the roadway infrastructure portion, and a control station including a display for displaying at a display instant subsequent to the capture instant, on the basis of the, or each, piece of information captured by the sensor system, a view of the roadway infrastructure portion on which is visible an image of the, or each, moving object moving in the roadway infrastructure portion,
wherein the monitoring system comprises at least a first computer for deriving from the, or each, piece of information captured by the sensor system a measured position and a measured speed of the, or each, moving object at the capture instant, and a second computer for deriving from the measured position and speed an estimated position of the, or each, moving object at the display instant,
wherein the sensor system comprises at least one camera configured to capture at the capture instant an image of the roadway infrastructure portion and the, or each, moving object moving therein,
wherein the image constitutes information relating to the, or each, moving object(s),
wherein the view of the roadway infrastructure portion constitutes an image of the infrastructure portion captured by the at least one camera, and the display is configured to display in the view of the roadway infrastructure portion a virtual image of the, or each, moving object at its estimated position,
wherein the at least one camera is fixed relative to the roadway infrastructure portion.

2. The system according to claim 1, wherein the sensor system comprises at least one radar and/or at least one LIDAR configured to capture at the capture instant a radar echo, respectively a LIDAR echo, of the, or each, moving object moving on the roadway infrastructure portion, wherein the radar echo, respectively the LIDAR echo, constitutes information relating to the, or each, moving object.

3. The system according to claim 1, wherein the image captured by the at least one camera at the capture instant constitutes the view of the roadway infrastructure portion.

4. The system according to claim 1, wherein the at least one camera is configured to capture images of the roadway infrastructure portion at a predetermined frequency, wherein the display is configured to refresh the view of the roadway infrastructure portion at a frequency greater than or equal to the predetermined frequency.

5. The system according to claim 4, wherein the first computer is configured to derive the measured position and the measured speed of the, or each, moving object by comparing the captured image with the at least one camera at the capture instant with an image of the roadway infrastructure portion previously captured by the at least one camera.

6. The system according to claim 1, wherein the virtual image is overprinted on the view of the roadway infrastructure portion.

7. The system according to claim 1, wherein the first computer is included in the sensor system.

8. The system according to claim 1, wherein the second computer is included in the control station.

9. A method for monitoring traffic in a roadway infrastructure portion, comprising the following steps:
capturing by a sensor system, at a capture instant, of at least one piece of information relating to at least one moving object moving in the roadway infrastructure portion, wherein the sensor system comprises at least one camera configured to capture at the capture instant an image of the roadway infrastructure portion and the, or each, moving object moving therein, wherein the image constitutes information relating to the, or each, moving object(s), wherein the at least one camera is fixed relative to the roadway infrastructure portion;
displaying, in a control station, at a display instant after the capture instant, on the basis of the, or each, piece of captured information, of a view of the roadway infrastructure portion on which is visible the, or each, moving object moving in the roadway infrastructure portion wherein the view of the roadway infrastructure portion constitutes an image of the infrastructure portion captured by the at least one camera;
calculating, from the, or each, piece of captured information, a measured position and a measured speed of the, or each, moving object at the capture instant;

deducing, from the measured position and speed, of an estimated position of the, or each, moving object at the display instant; and displaying, in the view of the roadway infrastructure portion, a virtual image of the, or each, moving object at its estimated position.

\* \* \* \* \*

UNITED STATES PATENT AND TRADEMARK OFFICE
CERTIFICATE OF CORRECTION

| | | |
|---|---|---|
| PATENT NO. | : 10,885,778 B2 | |
| APPLICATION NO. | : 16/396507 | |
| DATED | : January 5, 2021 | |
| INVENTOR(S) | : Cem Karaoguz | |

It is certified that error appears in the above-identified patent and that said Letters Patent is hereby corrected as shown below:

On the Title Page

Item (73), delete "TRANSDEV GROUP" and insert --TRANSDEV GROUP INNOVATION--

Signed and Sealed this
Fourth Day of April, 2023

Katherine Kelly Vidal
*Director of the United States Patent and Trademark Office*